May 18, 1954   A. S. RICHARDSON, JR   2,678,812
PEBBLE HEATER APPARATUS
Filed Oct. 19, 1951
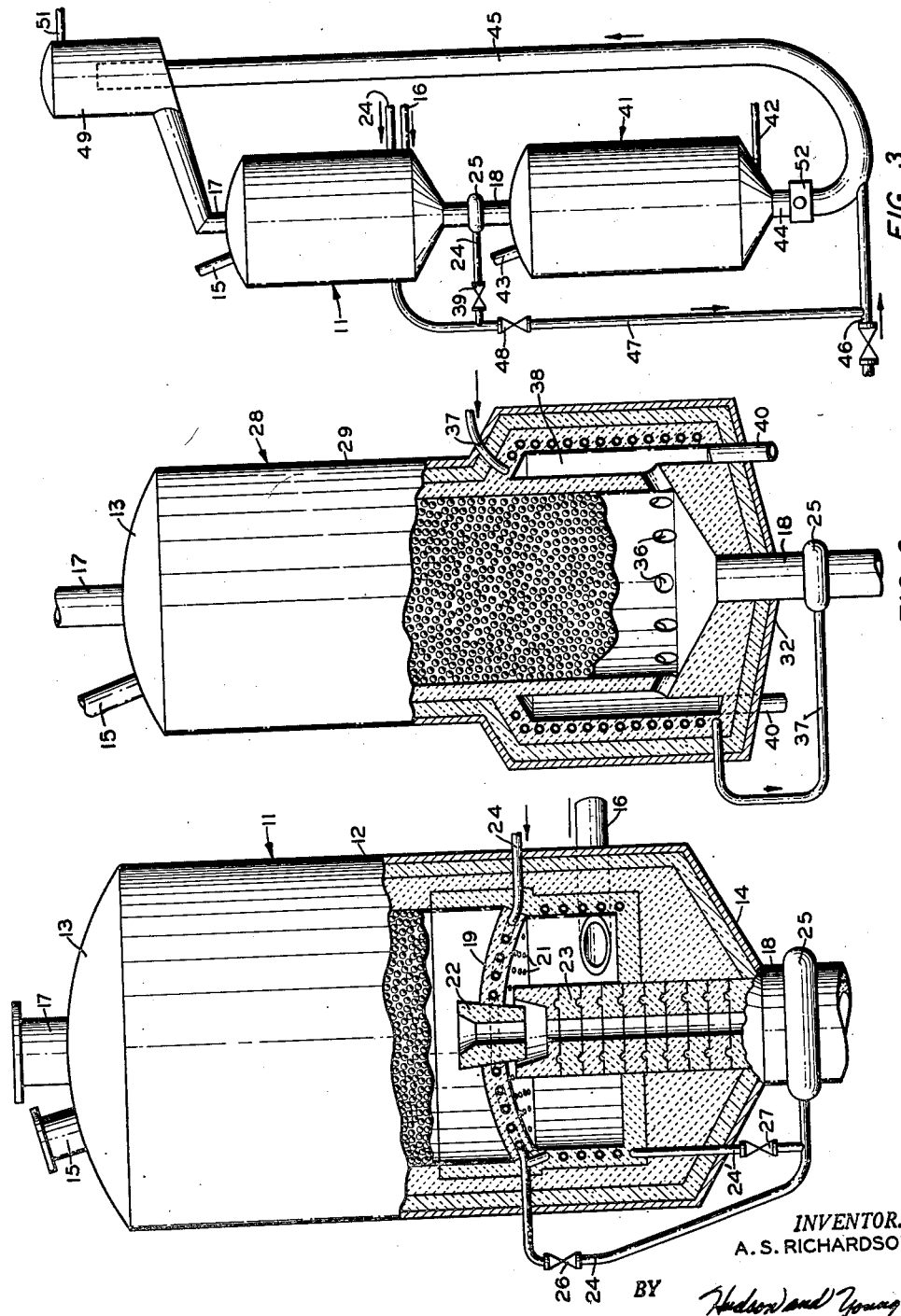
INVENTOR.
A. S. RICHARDSON, JR.
BY
ATTORNEYS Patented May 18, 1954

2,678,812

UNITED STATES PATENT OFFICE 2,678,812

PEBBLE HEATER APPARATUS

Allan S. Richardson, Jr., Bartlesville, Okla., assignor to Phillips Petroleum Company, a corporation of Delaware Application October 19, 1951, Serial No. 252,156

5 Claims. (Cl. 263—19)

This invention relates to pebble heater apparatus. In one of its more specific aspects, it relates to improved sealing means at the pebble inlet and outlet of a pebble reaction chamber. In another of its more specific aspects, it relates to improved pebble heater apparatus for the conversion of hydrocarbons. In another of its more specific aspects, it relates to the conversion of hydrocarbons in pebble heater apparatus.

Apparatus of the so-called "pebble heater" type has been utilized in recent years for the purpose of heating fluids to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater-type apparatus includes two refractory-lined contacting chambers disposed one above the other and connected by a refractory-lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form having strength which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about one inch in diameter. In a high temperature process, pebbles having a diameter of between about ¼ to ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chamber. Generally, pebble inlet temperatures in the second chamber are about 100° F. to 200° F. below the highest temperature of the pebbles within the first chamber. In processes for the production of ethylene from light hydrocarbons, such as ethane or propane, the pebble temperature in the reaction chamber is usually in the range of 1200° F. to 1800° F. For the production of acetylene by pyrolysis of hydrocarbons, temperatures in the range of 1800° F. to 3000° F. are desirable.

It is usually desirable, and in many cases essential, to prevent gases from passing from one of the contacting chambers to the other via the pebble throat. Thus, the presence of combustion products, such as the oxides of carbon in superheated steam, or in reaction products such as acetylene or ethylene, may lead to numerous process difficulties at points in the system downstream from the pebble heater itself. The alternative of permitting even a slight flow of products from the process chamber into the pebble heating chamber is often unattractive economically. While it is theoretically possible by a careful control of the relative pressures in the two chambers, to maintain a pressure differential so low that no flow can occur, it has been found as a practical matter that such close balancing of pressures often is not feasible. Hence, it has become the practice to introduce a small stream of an inert sealing or blanketing gas, usually steam, into the throat. Such gas is usually permitted to flow in both directions, i. e., into both the heating chamber and the reactor, thereby preventing flow from either chamber into the other.

While this practice has been of value in preventing flow of gases between chambers, it has been found that the introduction of steam into a cylindrical column of pebbles at temperatures at which it is ordinarily most available, i. e., 300° F. to 1000° F. may result in exposing the pebbles to thermal shock of such magnitude that the useful life of the pebbles is materially shortened. Thus, the art is confronted with the problem of supplying a throat-sealing gas at a temperature sufficiently high to avoid thermally shocking the pebbles without resorting to the use of ordinary products of combustion, which, while they can be supplied at high temperatures are objectionable on other grounds. The alternative of employing hot combustion gases for sealing purposes, in order to avoid the effects of thermal shock on pebbles, is often unattractive because of the resulting dilution of products with difficultly separable gases.

By at least one aspect of this invention, at least one of the following objects of the invention is attained. An object of this invention is to provide improved pebble heater apparatus for converting hydrocarbons. Another object of the invention is to provide improved means for heating sealing gas for use in sealing pebble throats to prevent the flow of gaseous materials from one chamber to another. Another object of the invention is to provide an improved method for reducing the temperature of walls confining a combustion chamber of pebble heater apparatus. Another object of the invention is to provide a method for preventing flow of gases from one pebble chamber to the other pebble chamber of pebble heater apparatus while preventing any substantial pebble breakage by reason of thermal shock. Other and further objects and advantages will be apparent to those skilled in the art upon study of the accompanying discussion and the drawings.

Broadly speaking, this invention comprises passing steam through conduits embedded in or formed by the walls forming the combustion chamber of pebble heater apparatus. Steam is superheated in these conduits and removes sufficient heat from the walls of the combustion chamber to materially reduce the temperature of those walls, thereby making possible the use of lower quality refractory materials in the formation of such chambers. The steam, which is superheated by the passage through the walls of such a chamber, is introduced into the throat between the pebble heating chamber and the reaction chamber and is substantially the temperature of the pebbles gravitating through that conduit. This superheated steam may be mixed with a stream of steam which has not been superheated so as to obtain a stream of steam at substantially the temperature of the pebbles gravitating from the bottom of the reaction chamber. This stream of steam is utilized for the introduction into the pebble throat extending from the bottom of the reaction chamber so as to seal that chamber against the escape of gaseous materials from the reaction chamber through the elevator to the pebble heating chamber. If a gas-lift type of elevator is used, the superheated steam may be utilized for mixing with additional steam or other inert gaseous material for the purpose of forming a lift gas which will be provided at a temperature such that thermal shock of the pebbles will not be caused.

Better understanding of this invention will be obtained upon reference to the diagrammatic drawings in which Figure 1 is a sectional elevation of a pebble chamber of this invention with sealing means in the pebble outlet conduit therefrom. Figure 2 is a sectional elevation of a preferred modification of the pebble chamber of this invention. Figure 3 is a schematic elevation of a pebble heater apparatus.

Referring particularly to Figure 1 of the drawings, pebble chamber 11 comprises upright elongated shell 12 closed at its upper and lower ends by closure members 13 and 14 respectively. Gaseous effluent outlet conduit 15 is provided in the upper end portion of chamber 11, preferably in closure member 13, and gaseous material inlet conduit 16 is provided in the lower portion of chamber 11. Conduit 16 may extend into the lower portion of chamber 11 either horizontally, vertically or tangentially. Pebble inlet conduit 17 is provided in the upper end of chamber 11 and is preferably axially disposed in closure member 13. Pebble outlet conduit 18 is provided in the bottom of chamber 11 and is preferably disposed coaxially with closure member 14.

Pebble support member 19 is provided intermediate the ends of the chamber formed within shell 12 and is provided with gaseous material conduits 21 which extend between the upper and lower sides of member 19. Closure member 19 separates the chamber formed within shell 12 into a combustion zone below the closure member and a heating zone above the closure member. Gaseous material conduits 21 are of such size as to permit the flow of gaseous materials from the combustion zone upwardly into the heating zone but to prevent the flow of particulate solid material from the heating zone into the combustion zone. Throat 22 is provided in pebble support member 19 so as to form a pebble conduit through the pebble support member and acts in conjunction with throat member 23 to form means whereby gravitating particulate solid material from the heating chamber is conveyed to pebble outlet conduit 18. Gaseous material inlet conduit 16, which extends into the lower portion of chamber 11, extends into the combustion chamber formed between pebble support member 19 and the bottom of chamber 11.

Sealing gas conduit 24 extends through the wall of shell 12 into a refractory lining therefore and, in one modification, extends over a circuitous route through the interior of pebble support member 19 and extends from that member through the wall of shell 12 to connect and communicate with pebble outlet conduit 18. In one preferred modification, pebble outlet conduit 18 is provided with a header member 25 which collects steam from conduit 24 and introduces that steam into the interior of pebble outlet conduit 18 at points distributed around a perimeter of that conduit.

Sealing gas conduit 24 is provided, in one modification, with valve means 26 at a point downstream of its exit from pebble support member 19 and sealing gas conduit 24' extends from sealing gas conduit 24 at a point adjacent its outlet from pebble support member 19 around the combustion chamber formed below pebble support member 19. Conduit 24' is preferably embedded in the insulating lining of the combustion chamber and extends downwardly from a point adjacent the bottom of the combustion chamber to connect once again with sealing gas conduit 24. Valve member 27 is provided to cut off the flow of sealing gas through conduit 24'.

Referring particularly to Figure 2 of the drawings, chamber 28 comprises an upright elongated shell 29 closed at its upper and lower ends by closure members 13 and 32. Pebble inlet conduit 17 is provided in the upper end of chamber 28, preferably coaxially in closure member 31. Gaseous material outlet conduit 15 is also provided in the upper end portion of chamber 28, preferably in closure member 31. Pebble outlet conduit 18 extends downwardly from the bottom end of chamber 28 and is preferably positioned coaxially in bottom closure member 32. Pebble outlet conduit 18 is provided with a header member 25, such as that described in connection with Figure 1. Chamber 28 differs from chamber 11 in that the combustion chamber formed in the lower portion thereof is formed adjacent the periphery of the pebble heating chamber and is provided with gaseous material outlet conduits 36 which convey gaseous material from the combustion chamber into the interior of the pebble heating zone. Sealing gas conduit 37 extends through shell 29 and passes by means of a circuitous route about the combustion chamber 38, preferably being disposed in the refractory insulation lining for that combustion zone. Sealing gas conduit 37 extends outwardly through shell 29, preferably at a point near the bottom of combustion chamber 38 and is connected to and communicates with header member 25. Gaseous material inlet conduits 40 extend from the exterior of chamber 28 into combustion zone 38.

In the operation of pebble heater apparatus, such as is shown in Figure 3 of the drawings, pebbles are introduced into the upper portion of chamber 11 through pebble inlet conduit 17 and form a contiguous gravitating mass of pebbles within that chamber. Gaseous heating material is introduced through conduit 16 into a combustion zone within the lower portion of chamber 11 where it is burned, and the resulting combustion products are introduced into the gravitating mass of pebbles within that chamber and pass countercurrently therethrough in direct heat exchange therewith. Gaseous effluent is removed from the upper portion of chamber 11 through effluent outlet conduit 15. During this operation, the walls of the combustion zone and, if utilized, of the pebble support member 19 are ordinarily raised to a high temperature by means of the heat of combustion resulting from the burning of the heating gas within the combustion zone. Sealing gas is introduced into indirect heat exchange with the gases in the combustion zone by passing it through sealing gas conduit 24 which extends by means of a circuitous route around the side walls of the combustion zone and, if utilized, through the pebble support member 19. If desired, the sealing gas conduit can also be passed in a circuitous path through the floor of the combustion zone. Sealing gas conduit 24 then extends from the indirect heat exchange with the combustion gases in the combustion zone to the header member 25 in pebble outlet conduit 18. Flow control valve 39 is provided, if desired, in conduit 24 downstream of the combustion zone so as to control the volume of flow therethrough.

The pebbles are heated in the heating chamber by direct heat exchange with the gaseous heating material to a temperature which is at least 100° F. to 200° F. above the desired reaction temperature within the reaction chamber. The hot pebbles are gravitated from the bottom of chamber 11 through pebble outlet conduit 18 into the upper portion of reaction chamber 41 and form a gravitating contiguous mass of pebbles therein. Reactant materials are introduced into the lower portion of reaction chamber 41 through inlet conduit 42 and pass upwardly in direct heat exchange with the heated pebbles within that chamber. Resulting reaction products are removed from the upper portion of that chamber through gaseous effluent conduit 43. The pebbles are gravitated from the bottom of reaction chamber 41 through pebble outlet conduit 44 and are elevated to the upper end portion of chamber 11 through elevator means 45. Elevator means 45 may be a mechanical type of elevator, such as a bucket type elevator, or a helical screw-type elevator, or by means of a gas-lift. If elevator 45 is a gas-lift type, the conveying gas is introduced into the elevator through conduit 46. The temperature of this elevating gas may be raised by admixture with a portion of the superheated sealing gas obtained from conduit 24, which gas is conveyed to conduit 46 by means of conduit 47. Flow control valve 48 is provided in conduit 47 so as to control the flow of the superheated sealing gas through that conduit. Pebbles conveyed by means of the gas-lift are elevated into separator 49, which is of a conventional type, wherein the pebbles and gaseous materials are separated and gaseous effluent is removed through conduit 51, the pebbles being gravitated into chamber 11 through pebble conduit 17. Pebble flow control 52 is provided intermediate the ends of pebble outlet conduit 44.

Although this invention has been particularly described in connection with chambers having axially disposed pebble conduits, it is contemplated that the invention is equally adaptable to chambers utilizing peripheral pebble inlet and outlet conduits.

Various modifications of this invention can be made by those skilled in the art in view of the foregoing discussion and disclosure. Such modifications are believed to be within the spirit and the scope of this invention.

I claim:

1. An improved pebble heater comprising in combination a closed, refractory lined, upright shell; pebble inlet means in the upper portion of said shell; gaseous effluent conduit means in the upper portion of said shell; a refractory partition separating a heating gas distribution zone from a pebble heating zone in the lower portion of said shell; pebble outlet conduit means extending downwardly from the lower portion of said pebble heating zone through said shell; sealing gas inlet means connected to said pebble outlet conduit means intermediate its ends; heating gas conduit means extending between said distribution zone and said pebble heating zone; heating material inlet means extending into said heating gas distribution zone; and sealing gas conduit means extending into said shell and circuitously through at least a portion of the refractory about said gas distribution zone, in indirect heat exchange with said zone and connected at its outlet end to said sealing gas inlet means.

2. An improved pebble heater chamber comprising in combination a closed, refractory lined, upright shell; pebble inlet means in the upper portion of said shell; gaseous effluent conduit means in the upper portion of said shell; sealing gas inlet means connected to said pebble outlet means intermediate its ends; a refractory perforate pebble support extending transversely across the lower portion of the chamber formed within said shell and separating a refractory lined heating gas distribution zone below the support from a pebble heating zone above the support; pebble outlet conduit means extending downwardly from the lower portion of said pebble heating zone through said shell heating material inlet means extending into said heating gas distribution zone; and sealing gas conduit means extending into the lower portion of said refractory shell and circuitously through said pebble support in indirect heat exchange with said gas distribution zone and connected at its outlet to said sealing gas inlet means.

3. The pebble heater chamber of claim 2, wherein said sealing gas conduit means extend in a circuitous path through the walls encompassing said gas distribution zone and said pebble support.

4. An improved pebble heater chamber comprising in combination a closed, refractory lined, upright shell; pebble inlet means in the upper portion of said shell; gaseous effluent conduit means in the upper portion of said shell; pebble outlet conduit means extending downwardly from the lower portion of said shell; sealing gas inlet means connected to said outlet conduit means intermediate its ends; an upright refractory wall spaced from the outer wall of said shell in its lower portion forming therebetween a gas distribution zone; heating gas conduit means extending between said distribution zone and said pebble heating zone; heating material inlet means extending into said gas distribution zone; and sealing gas conduit means extending into said shell and circuitously about said heating gas distribution zone through at least one of the refractory walls encompassing said zone and in indirect heat exchange with said zone and connected at its outlet end to sealing gas inlet means.

5. An improved pebble heater apparatus comprising in combination a first closed, upright, refractory lined shell; pebble inlet means in the upper portion of said shell; gaseous effluent conduit means in the upper portion of said first shell; a refractory partition separating a heating gas distribution zone from a pebble heating zone in the lower portion of first shell; heating gas conduit means extending between said distribution zone and said pebble heating zone; heating material inlet conduit means extending into said gas distribution zone; a second closed, upright shell below said first shell; pebble conduit means extending between the pebble heating zone of first said shell and the upper end of said second shell; sealing gas inlet means connected to said pebble conduit means intermediate said first and second shells; gaseous effluent conduit means in the upper portion of said second shell; gaseous material inlet means in the lower portion of said second shell; pebble outlet conduit means in the lower portion of said second shell; an elevator extending upwardly from said pebble outlet conduit in said second shell and connected at its upper end to said pebble inlet conduit means in said first shell; lift gas inlet means in the lower end of said elevator; and sealing gas conduit means extending into said first shell and circuitously through at least a portion of the refractory material confining said heating gas distribution zone and in indirect heat exchange with said zone and connected at its outlet end to said sealing gas inlet means and said lift-gas inlet means.

References Cited in the file of this patent

UNITED STATES PATENTS

| Number | Name | Date |
| --- | --- | --- |
| 2,429,359 | Kassel | Oct. 21, 1947 |
| 2,499,703 | Utterback | Mar. 7, 1950 |
| 2,518,842 | Weber | Aug. 15, 1950 |
| 2,548,030 | Leffer | Apr. 10, 1951 |